United States Patent

Hong et al.

[11] Patent Number: 6,081,050
[45] Date of Patent: Jun. 27, 2000

[54] LINEAR ACTUATOR USING RADIAL BEARING

[75] Inventors: Yeh Sun Hong; Chong Won Lee, both of Seoul, Rep. of Korea

[73] Assignee: Korea Institute of Science and Technology, Rep. of Korea

[21] Appl. No.: 09/167,859

[22] Filed: Oct. 7, 1998

[30] Foreign Application Priority Data

Feb. 13, 1998 [KR] Rep. of Korea .......................... 98/4385

[51] Int. Cl.$^7$ ................................................... H02K 7/06
[52] U.S. Cl. ................................................. 310/20; 310/12
[58] Field of Search ........................... 310/20, 12, 80; 74/25, 89; 476/36

[56] References Cited

U.S. PATENT DOCUMENTS

| | | | |
|---|---|---|---|
| 4,203,328 | 5/1980 | DeBoynton | 74/25 |
| 4,660,431 | 4/1987 | Heine | 74/89.15 X |
| 4,947,698 | 8/1990 | Dodds et al. | 74/25 |

*Primary Examiner*—Nestor Ramirez
*Assistant Examiner*—Judson H. Jones
*Attorney, Agent, or Firm*—Ostrolenk, Faber, Gerb & Soffen, LLP

[57] ABSTRACT

A extendable/retractable linear actuator includes a rotational driving member having a rotational shaft, a rotational unit engaged to the rotational shaft of the rotational driving member, extended toward a rotational shaft direction, and rotatably driven in accordance with the rotational driving member, a plurality of radial bearings each respectively having a bearing rotation shaft inclined by an angle ($\alpha$) against the rotational shaft axis direction, and symmetrically fixed to each opposing and surface of the rotational unit, and a cylindrical movement tube, surrounding the rotational unit, an inner periphery thereof being in contact with the radial bearings. The linear actuator is directed to minimizing the number of parts and decreasing friction between the parts, thereby accomplishing a simplified and cost-effective structure having an operational efficiency due to a small rolling friction.

11 Claims, 10 Drawing Sheets

A – A'

B – B'

A - A'

B - B'

C - C'

A-A'

B-B'

C-C'

A-A'

B-B'

C-C'

A − A'

B − B'

C − C'

LINEAR ACTUATOR USING RADIAL BEARING

BACKGROUND OF THE INVENTION

1. Field of the Invention

The present invention relates to a linear actuator, more particularly, to an improved linear actuator for translating a rotary motion resulting from a rotary motor into a linear motion.

2. Description of the Background Art

A conventional linear actuator for linearly operating a target object employs an electric motor or an oil hydraulic motor which has an rotating shaft. Various linear actuators are known, including a rack-and-pinion gear type linear actuator, a screw type linear actuator, a ball screw type linear actuator and a crank-arm type linear actuator.

With reference to the accompanying drawings, the constructions of the respective conventional linear actuators will now be described.

FIG. 1 is a schematic view showing the construction and operation method of a general pick and place apparatus adopting a linear actuator. As shown therein, the pick and place apparatus comprises a two-axis joint type mechanism including two rotational joints 11, 12.

In order to operate the apparatus, linear actuators 13, 14, such as a oil hydraulic cylinder are required which are extendable and retractable along their lengthwise directions.

FIG. 2 illustrate a conventional rack-and-pinion gear type linear actuator. As shown therein, the rack-and-pinion gear type linear actuator allows a rod 23 with a connection link 26 to be extended/retracted toward/from the linear actuator body, thereby satisfying the basic requirements thereof.

However, the rotation axis of a motor 25 for rotating the pinion 21 has to be perpendicular to that of the linear actuator, so that it is impossible to employ the same when there is a limitation with regard to the width of the linear actuator.

Besides, in addition to the space required for the rack 22 to reciprocate, an additional space is required so that the rod 23 at each end of the rack can make a reciprocating sliding movement therethrough, thereby disadvantageously increasing the size of the linear actuator body.

FIG. 3 is a schematic view of a conventional screw type linear actuator. As shown therein, such a screw type actuator satisfies the basic requirements of a linear actuator in principle, wherein a tube 31 having a female screw structure extends and retracts. However, friction between the female screw tube 31 and a male screw rotating unit 32 threadedly provided in the tube 31 lessens the efficiency of the actuator. In addition, when a load force F is imposed on the hinge at the connection link 36 and accordingly a bending moment M ($M=F_R S$) is applied to an end portion of the tube 31, a normal force N ($N=M/L$) and a friction force $F_f$ ($F_f=\mu N$) which are applied to the screw threads of the male screw rotating unit 32 are increased, thereby incurring abrasion and stoppage due to locking, which may cause an interruption of the actuator.

FIG. 4 is a schematic view of a conventional ball screw type linear actuator. As shown therein, a sliding friction of the screw thread contact surface is converted into a rolling friction of balls 41 which circulate in and along the male screw body, so that the friction may be significantly reduced. However, in the ball screw type actuator, since a female screw movement unit 42 having a connection link 44 reciprocates between both ends of a fixed length of a male screw thread 43, this can cause a failure to satisfy a basic requirement that a linear actuator should be extended/retracted along its lengthwise direction.

Further, a coupling 47 for connecting a male screw rod and a radial bearing 46 which supports the male screw rod with a rotary motor 45 are additionally required, which thereby disadvantageously increases the production cost.

FIG. 5 illustrate a conventional crank-arm type linear actuator. As shown therein, the crank-arm type linear actuator is simple in construction. However, since the operating axis of the rotary motor 55 is perpendicular to the axis of a linear movement of the linear actuator, similar to the above-described rack-pinion gear type, and a space for the crank-arm 53 to rotate is additionally required, the width and height of the actuator are undesirably enlarged. In addition, the driving force of the rod 51 disadvantageously changes depending upon a rotational angle of the crank-arm.

In recent years, as shown in FIGS. 6A through 6C, a low friction linear actuator using a radial bearing instead of a ball screw was introduced. However, such a low friction linear actuator has disadvantages because it does not satisfy a basic requirement that a linear actuator should be extendable/retractable along its lengthwise direction in the same way as the ball screw type in FIG. 4.

In the construction of the actuator shown in FIGS. 6A through 6C, front and rear three radial bearings 63, 63', 63", 64, 64', 64" inscribed an inclination angle α on the rotational shaft 65, whereby the rotation of the rotational shaft leads to a linear movement of the movement units 61, 62 to which the radial bearings 63, 64 are fixed.

Here, the radial bearings 63, 64 are in contact with the rotational shaft with a predetermined force, so that the movement units are separated into an upper portion 61 and a lower portion 62 which are then compressed by springs 66, 66'. The compressive force of the springs is adjustable using screws 67, 67'.

The advantages of such a construction are that, since the movement units 61, 62 are linearly operated due to a spiral movement resulting from a rolling contact between the radial bearings and the rotational shaft, the friction force of the operation is significantly small, and even when the normal force increases due to the bending moment applied to the movement units, the operating efficiency has no significant change.

However, in this type linear actuator, the linear actuator does not satisfy a structural requirement that an actuator itself should be extendable/retractable in the same way as the ball screw type, because the radial bearings are designed to be inscribed on the rotational shaft. Further, the linear actuator according to this type is has an additional disadvantage in that a coupling 70 for connecting the radial bearings 69, 69' with a rotary motor 71 is additionally required.

SUMMARY OF THE INVENTION

The present invention is directed to solving the conventional art's disadvantages.

Accordingly, it is an object of the present invention to provide a linear actuator having a simple construction, which translates rotary motion of a rotary motor into a linear motion.

It is another object of the present invention to provide a linear actuator having a high actuation efficiency by minimizing required parts thereof and consequently decreasing the friction between the parts.

To achieve the above-described objects, there is provided a linear actuator according to the present invention which includes a rotary driving member having a rotational shaft; a rotational unit engaged to the rotational shaft of the rotary driving member, which extends toward a rotational shaft direction and is rotatably driven by the rotary driving member; a plurality of radial bearings each respectively having a bearing rotation shaft inclined by an inclination angle ($\alpha$) relative to the rotational shaft direction and being symmetrically fixed to each opposing surface of the rotational unit in the direction of the rotational axis X; and, a cylindrical movement tube, surrounding the rotational unit, an inner periphery thereof being in contact with the radial bearings.

Further, in another embodiment of the present invention, a helical female screw portion is formed in an inner surface of a cylindrical movement tube, wherein radial bearings engage with the female screw portion, and move along the screw portion. This construction prevents slip between the rotational unit and the cylindrical movement tube, and thus may ensure the operational accuracy degree of the linear actuator. The female screw portion comprises a multi-screw portion in the number of the radial bearings disposed on each side of the rotational unit, e.g., if three bearings are provided on one side of the rotational unit, the female screw portion is formed by a triple-threaded screw in order to receive the three bearings.

These and other objects and advantages of the present invention will become more readily apparent from the detailed description given hereinafter. However, it should be understood that the detailed description and specific example, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be better understood with reference to the accompanying drawings which are given only by way of illustration and thus are not limitative of the present invention, wherein.

DETAILED DESCRIPTION OF THE PREFERRED EMBODIMENTS

The present invention is an improved version of the linear actuator as shown in FIG. 6. Radial bearings in FIG. 6 circumscribed spiral paths on the exterior of a rotating shaft. The linear actuator according to the present invention, however, has radial bearings which inscribe helical paths on the internal surface of an external tube (cylindrical movement tube) instead of being circumscribed on the outer surface of a rotating shaft, as in the conventional linear actuator.

The construction of the linear actuator according to a first embodiment of the present invention is illustrated in FIG. 7. As shown therein, the radial bearings 3, 3', 3", 4, 4', 4" are movably fixed to a rotational shaft with a predetermined inclination angle, so as to make a spiral movement and translate the shaft's rotational movement into a linear movement in accordance with a rolling friction of the radial bearings, in the same way as the linear actuator in FIGS. 6A to 6C.

The construction of the present invention, however, is provided such that the paths of radial bearings are inscribed on the inner surface of a cylindrical movement tube 1 instead of being inscribed on the rotational shaft, and accordingly when a rotational unit 2 directly connected to a rotational driving member starts its rotation, the tube 1 attached thereto by the connection link 6 makes a movement, whereby the linear actuator itself undergoes an extension/retraction along a lengthwise direction thereof.

Figure 6A:
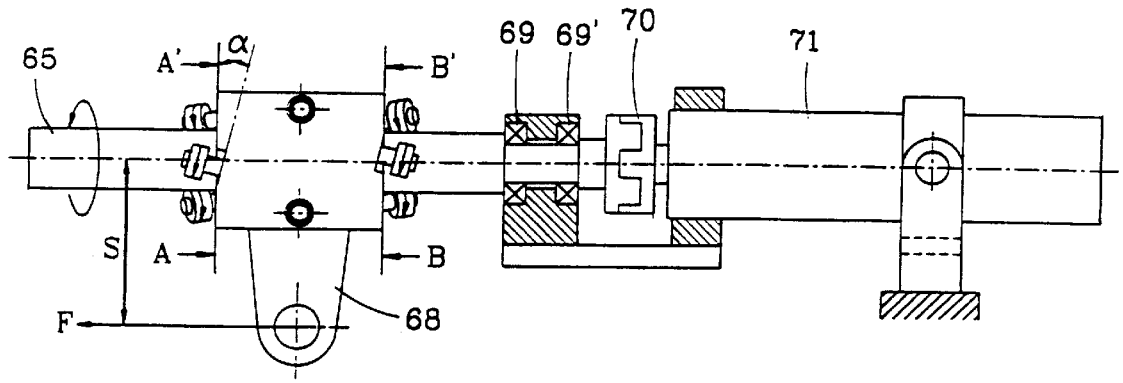
FIGS. 6A, 6B and 6C are partially cross-sectioned schematic views of a conventional linear actuator employing roller bearings.
Figure 6B:
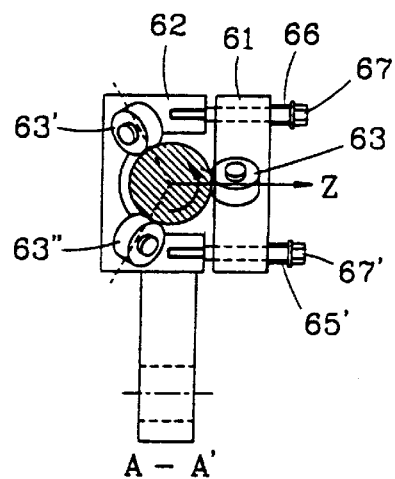
Figure 6C:
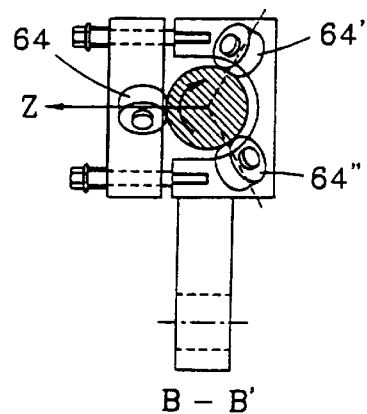
Figure 7A:
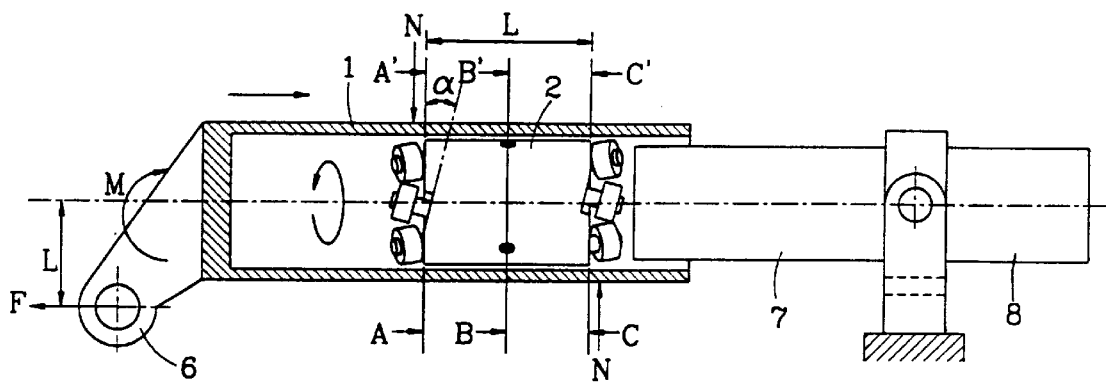
FIGS. 7A, 7B, 7C and 7D are partially cross-sectioned schematic views of a linear actuator according to a first embodiment of the present invention.
Figure 7B:
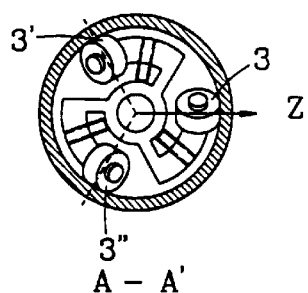
Figure 7C:
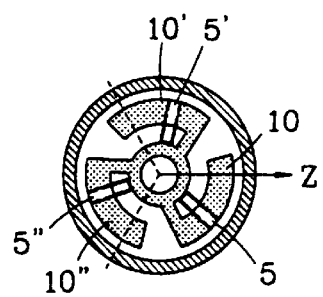
Figure 7D:
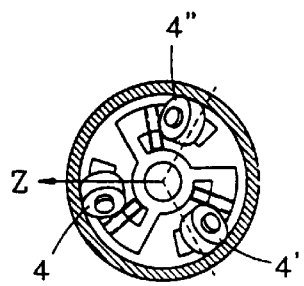

This makes the present invention different from the conventional linear actuator in FIGS. 6A to 6C.

As described above, two problems must be resolved to provide the construction with the radial bearings on the inner surface of the tube in the linear actuator. That is, the radial bearings should be provided so as to be in contact with the tube under a predetermined force, and such a contact force should be appropriately adjusted in its assembly. This is because the portion on which the radial bearings are mounted has a radial elasticity which can be controlled by providing appropriate members such as screws.

The linear actuator according to the present invention includes a rotational driving member 7 such as an electrical motor having the rotating shaft, a rotational unit 2 connected to the rotational driving member, extended along the rotating shaft and rotatably driven by the rotational driving member, a plurality of radial bearings 3, 3', 3", 4, 4', 4" symmetrically fixed to each side end surface of the rotational unit 2 in the direction of the rotational axis X wherein the rotation axis of each radial bearing has a predetermined inclination angle relative to the rotational shaft, and the cylindrical movement tube 1 surrounding the rotational unit 2 and being inscribed therewith by the radial bearings.

Depending upon the usage requirements of the radial bearings, ball bearings or roller bearings may be employed, to which the present invention is not limited.

The rotational unit 2 includes a central hub portion 9 connected to the rotational shaft of the rotational driving member 7, a plurality of cantilever arms 10, 10', 10" having spiral extensions by length L along the axial direction of the rotational shaft along the outer periphery of the central hub portion, radially protruded and having a predetermined thickness H, and disposed in a propeller type manner to be elastically movable toward a radial direction, and bending moment adjusting members 5, 5', 5" such as screws, to adjust the bending moment toward the radial direction of the cantilevers. Here, both ends of the cantilevers are provided with sloped surfaces having a predetermined angle relative to the axial direction of the rotational shaft so as to mount the radial bearings onto the rotational unit 2 with an inclination relative to the rotating shaft X by an angle α, and consequently to enable the cylindrical movement tube 1 to move linearly along the rotational unit 2 in response to the rotation of the rotational driving member, by means of the secure contact between the radial bearings and the cylindrical movement tube. A radial bearing is mounted on the sloped surfaces of each cantilever arm, for example, by means of a bolt penetrating the center of the radial bearing.

The elastic coefficients of the respective cantilever arms 10, 10', 10" may be adjusted by differentiating the radial length H and axial length L of the cantilever arms.

Also, as shown in FIGS. 9A–9D, without changing the length of the rotational unit 2, the respective lengths of the cantilever arms for fixing the radial bearings may be reduced so as to be partially formed at each end portion of the rotational unit 2, thereby adjusting the elastic coefficient of the cantilever arms.

The number of the cantilever arms may be three, and consequently, three radial bearings can be disposed on each side of the rotational unit 20 at an even angular interval of 120 degrees.

In another aspect of the present invention, a female screw portion is formed in the inner surface of the cylindrical movement tube along which radial bearing move.

With reference to the accompanying drawings, the linear actuator according to the present invention will be now described in more detail.

FIGS. 7 and 8 respectively illustrate the first embodiment of the present invention. As shown therein, the three cantilever arms 10, 10', 10" are extended toward a lengthwise direction over the entire length of the rotational unit 2, and radial bearings are fixed onto the sloped surface of each end portion of each of the cantilever arms.

In order for the radial bearings 3, 3', 3", 4, 4', 4" to obtain an appropriate contact force with regard to the cylindrical movement tube 1, the rotational unit 2 is provided with three cantilever arms 10, 10', 10" of a propeller type supporting the radial bearings to be axially symmetrically arrayed at the opposed sides of the rotational unit 2, and the respective cantilever arms are provided such that they can elastically move in the radial direction.

The initial bending moment of the respective cantilever arms in the radial direction is adjustably applied using the adjusting members 5, 5', 5" such as screws, so that the contact force of the radial bearings against the external cylindrical movement tube 1 can be appropriately adjusted during the assembly process. The member for adjusting the initial bending moment according to the embodiment of the present invention includes screws which penetrate portions near the center of the cantilever arm's side wall, and which are in contact with the outer surface of the central hub portion 9 of the rotational unit 2.

Figure 8A:
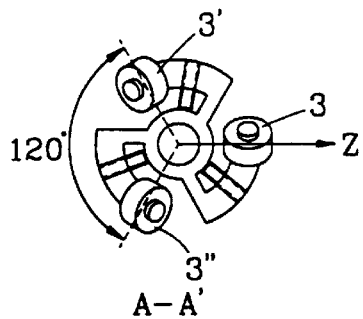
FIGS. 8A through 8C and 8D are respectively detailed views and a cross-sectional view of a rotational unit of the linear actuator according to the first embodiment of the present invention.
Figure 8B:
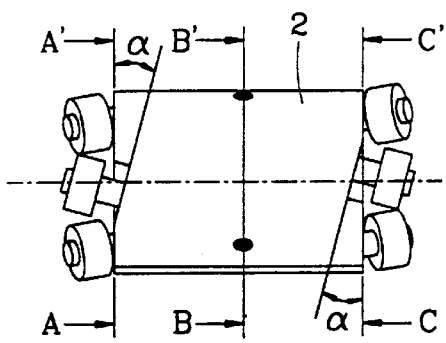
Figure 8C:
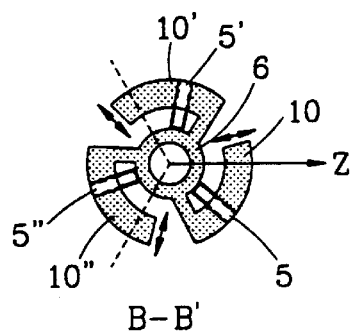
Figure 8D:
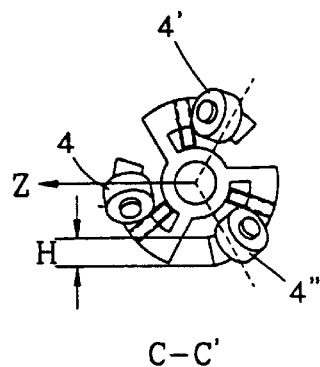
Figure 9A:
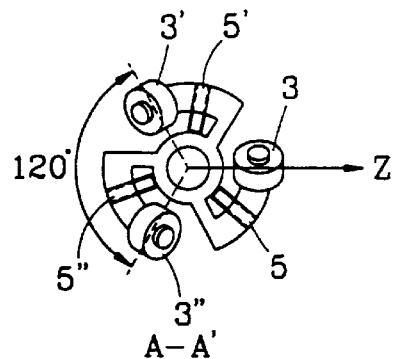
FIGS. 9A through 9C and 9D are respectively detailed views and a cross-sectional view of a rotational unit having a different type of cantilever transformed from the first embodiment of the present invention.
Figure 9B:
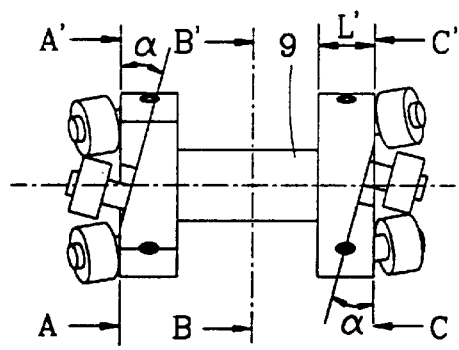
Figure 9C:
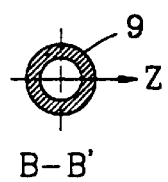
Figure 9D:
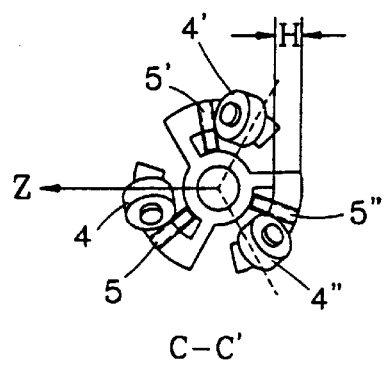
Figure 10A:
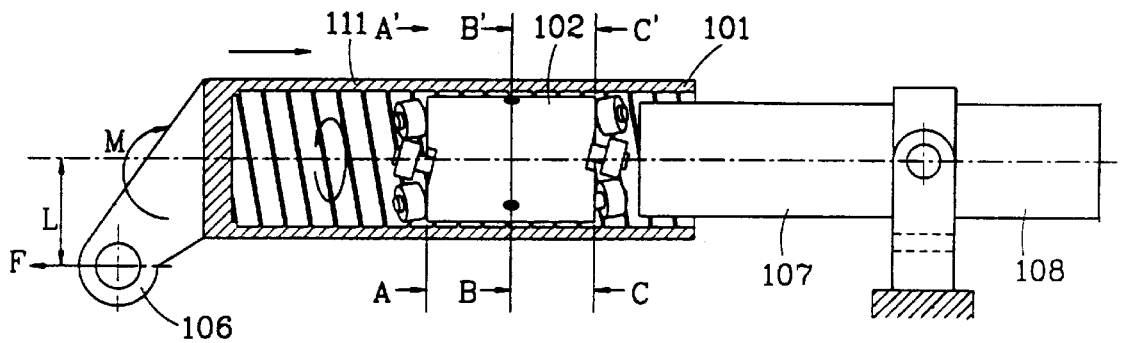
FIGS. 10A through 10D are respectively detailed views and a cross-sectional view of a linear actuator according to a second embodiment of the present invention.
Figure 10B:
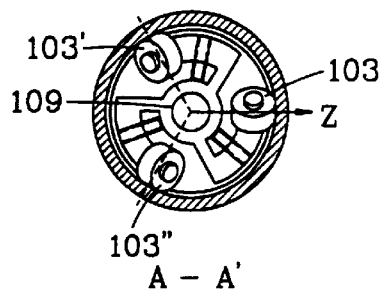
Figure 10C:
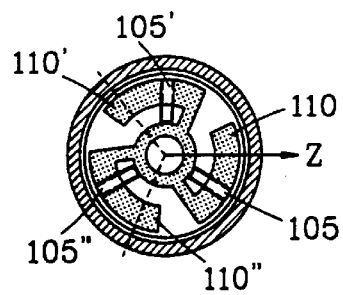
Figure 10D:
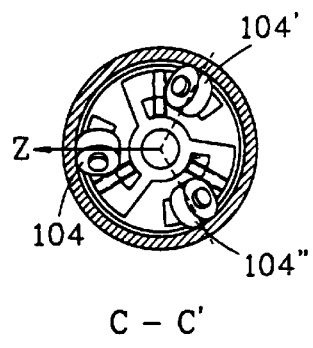

FIGS. 8A–8C are a detailed views and FIG. 8D is a cross-sectional view illustrating the rotational unit 2 of the linear actuator according to the present invention. As shown therein, the inclined surface on which each of the radial bearings 3, 3', 3", 4, 4', 4" are to be fixed is cut off to an extent so as to have an angle α relative to the perpendicular direction of the rotational shaft of the rotational driving means such as a rotary motor, and the respective radial bearings are fixed by bolts penetrating the centers of the respective bearings to the inclined surface of each end of the cantilever arms. Here, the angle α is determined depending on a required driving force and a driving speed of the actuator.

Also, the three radial bearings may be respectively disposed by a 120 degree interval at each end of the rotational unit 2, thereby forming an axial symmetry around the rotational axis X.

When viewed from each side end of the rotational unit (left and right side views in FIGS. 8A and 8C), the three radial bearings at each end are formed into a group and arrayed respectively by a 120 degree interval to thereby be symmetrical about the Z-axis, wherein the Z-axis is defined as a line from the center of the rotational axis to one of the bearing centers.

Consequently, on both ends of the rotational unit 2, a total of six radial bearings are mounted. The entire number of the radial bearings, however, is not limited to six.

In addition, the array intervals of the radial bearings can be selected depending upon the number of the cantilever arms.

FIGS. 9A–9D illustrate the linear actuator having another type of cantilever arm modified from the first embodiment of the present invention. As shown therein, in order to appropriately adjust the elastic coefficient of the cantilever arms, the cantilever arms have a predetermined length L'<(L/2), and are only partially disposed at each end of a rotational unit 2, differently from the above-described example in which the cantilever arms extend the entire length of the rotational unit 2.

That is, the elastic coefficient of the cantilever arms for supporting the radial bearings is determined by the radial length (thickness) H and the axial length L of the cantilever arms, so that the elastic coefficient of the cantilever arms may be changed by adjusting the length L' of the cantilever arms for supporting the radial bearings without changing the entire length L of the rotational unit.

Referring to FIGS. 10A–10D illustrating a linear actuator according to a second embodiment of the invention, a general construction thereof is similar to that of the first embodiment, but the second embodiment has a difference in that a helical female screw portion 111 is provided on the inner surface of the cylindrical movement tube 101. In the linear actuator according to the first embodiment shown in FIGS. 7A–7D, if the contact between the radial bearings 3,3',3", 4,4',4" and the cylindrical movement tube 1 is not sufficient, when a large external force F is applied to the linear actuator, the cylindrical movement tube 1 may slip in the axial direction even in the case that the rotational unit 2 does not rotate. This construction can be an advantage in that the slip between the rotational unit and movement tube prevents damage to the actuator by eliminating the risk that an overload is applied to the actuator, while it can be a disadvantage in a precision instrument in which slip is not permissible, since the actuation accuracy is not ensured due to the slip. This slip can be prevented by the second embodiment of the present invention in which the radial bearings 103,103', 103"; 104,104', 104" move along the female screw portion 111 by engaging with a helical recess of the screw thread portion formed on the inner surface of the cylindrical movement tube 101. This construction ensures the actuation accuracy of the linear actuator, since slip between the rotational unit 102 and the movement tube 101 does not occur due to the engagement of the bearings 103,103'103";104,104',104" and female screw thread 111 in the movement tube 101. As similar to the first embodiment, since the three radial bearings are disposed on each end of the rotational unit 102 with an even angular interval of 120 degrees, the female screw portion 111 also comprises a triple-threaded screw portion to receive the three bearings. In addition, since the rotation axis of the bearings is inclined by an angle α relative to the rotational shaft of the rotary driving means, the pitch angle of the female screw portion 111 is also α. The arrangement can be modified in accordance with the number and arrangement of the bearings, e.g., if four radial bearings are disposed on each end of the rotational unit with an even angular interval of 90 degrees, the female screw portion also comprises a quadruple-threaded screw. The length L of the rotational unit should be determined in order for three pairs of the bearing 103,104; 103',104'; 103",104" to exactly engage with the triple-threaded screw, wherein one of the bearing at the one end of the rotational unit and the corresponding bearing at the other end engage with the same thread of the female screw portion.

The operation of the linear actuator according to the present invention will now be described.

When the rotational unit 2 is rotated by the rotational driving means 7, the cylindrical movement tube 1 may move spirally along the rotational axis(X) by means of the secure contact of the radial bearings 3,3',3",4,4',4" and the interior surface of the tube, and the predetermined inclination angle between the rotational axis of the bearings and the rotational axis of the linear actuator (or inclination angle of the screw tread).

Then, since the rotational unit remains fixed, the cylindric tube inscribed on the bearings becomes extendable or retractable, and the operational direction is subject to change in accordance with the conversion of the rotational direction of the rotational actuator, whereby the operating speed can be adjusted by converting the inclination angle and the rotating speed of the rotational actuator.

Figure 1:
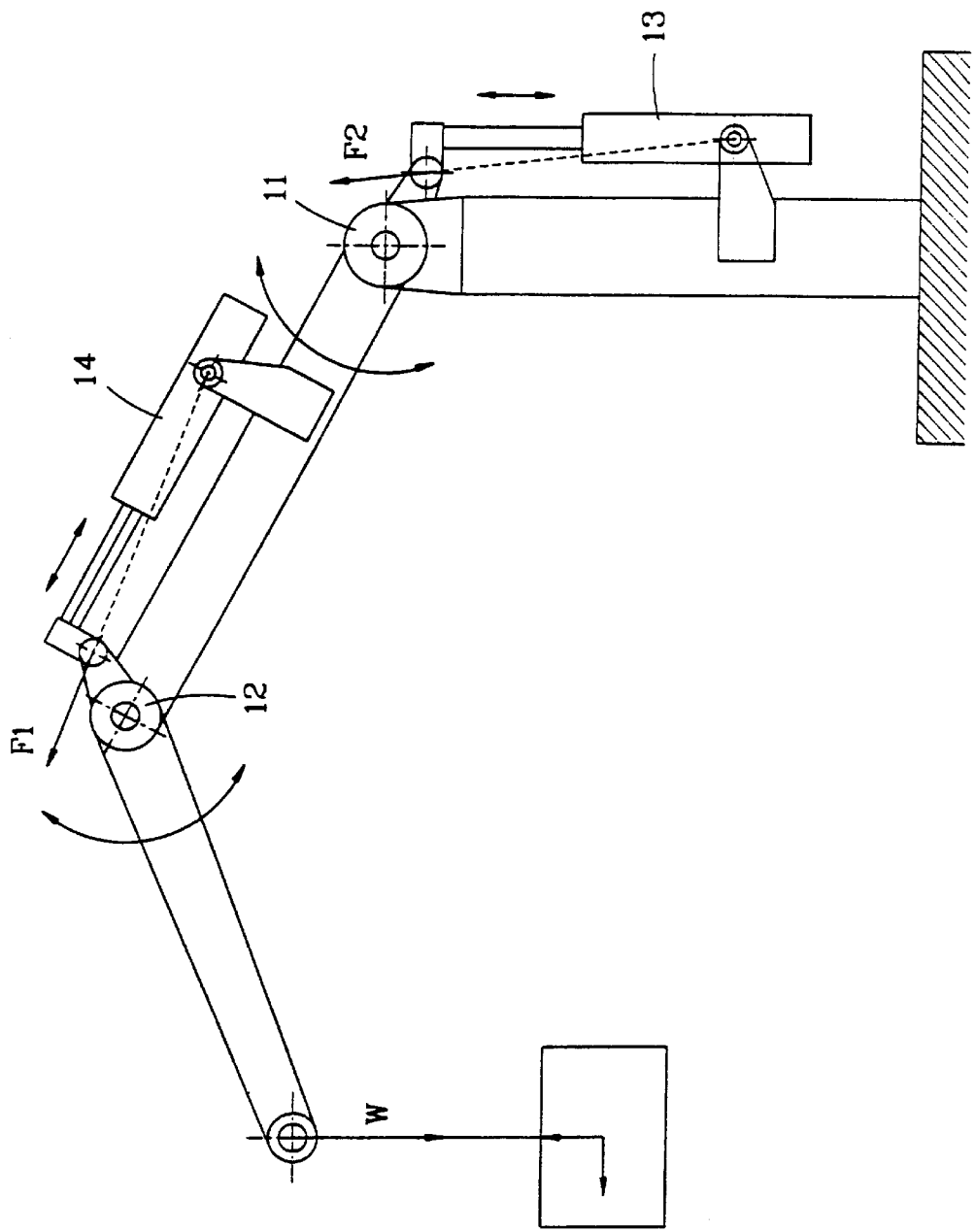
FIG. 1 is a schematic view of a general pick and place apparatus employing a linear actuator apparatus.
Figure 2:
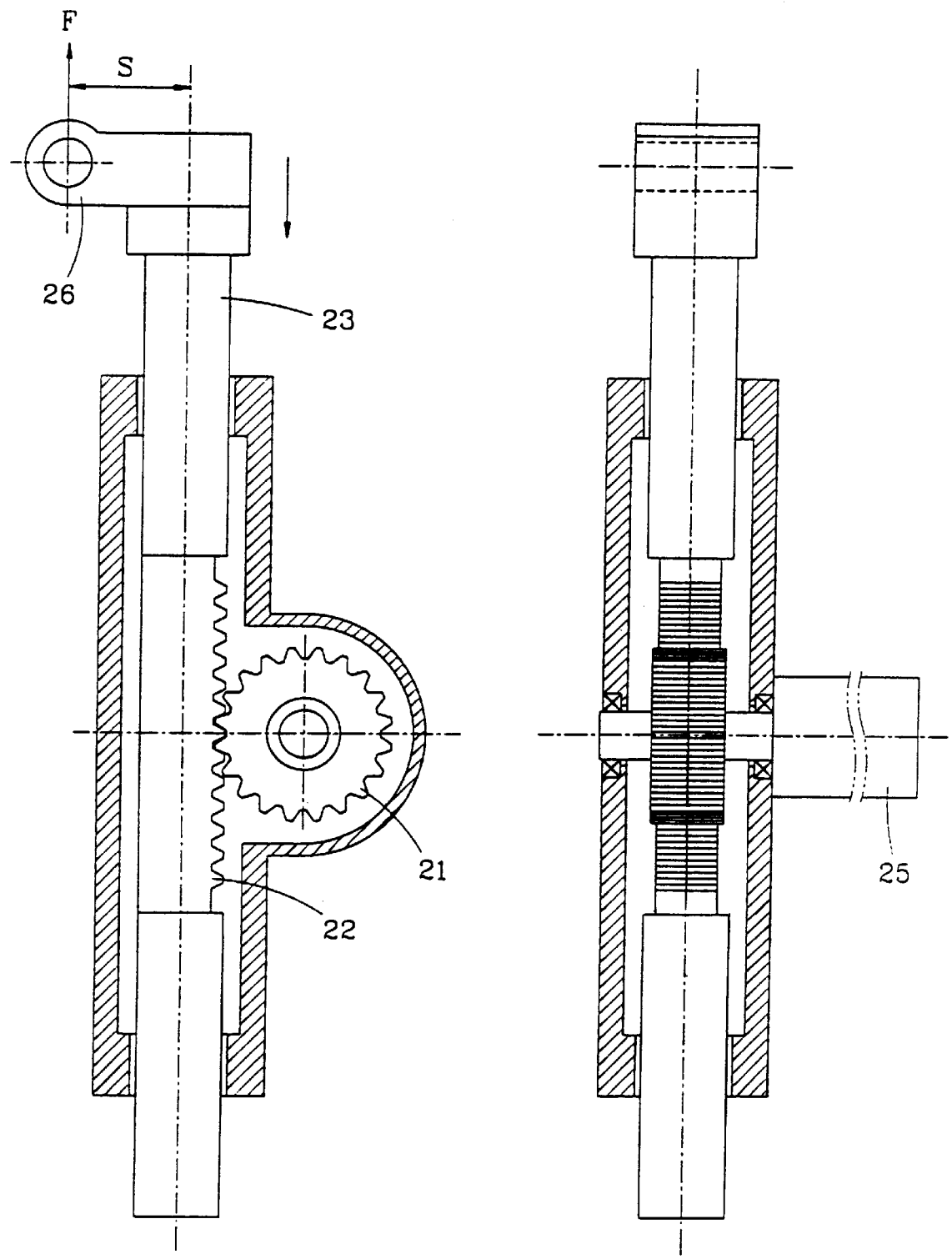
FIG. 2 is partially cross-sectioned schematic view of a conventional linear actuator employing a rack-and-pinion mechanism.
Figure 3:
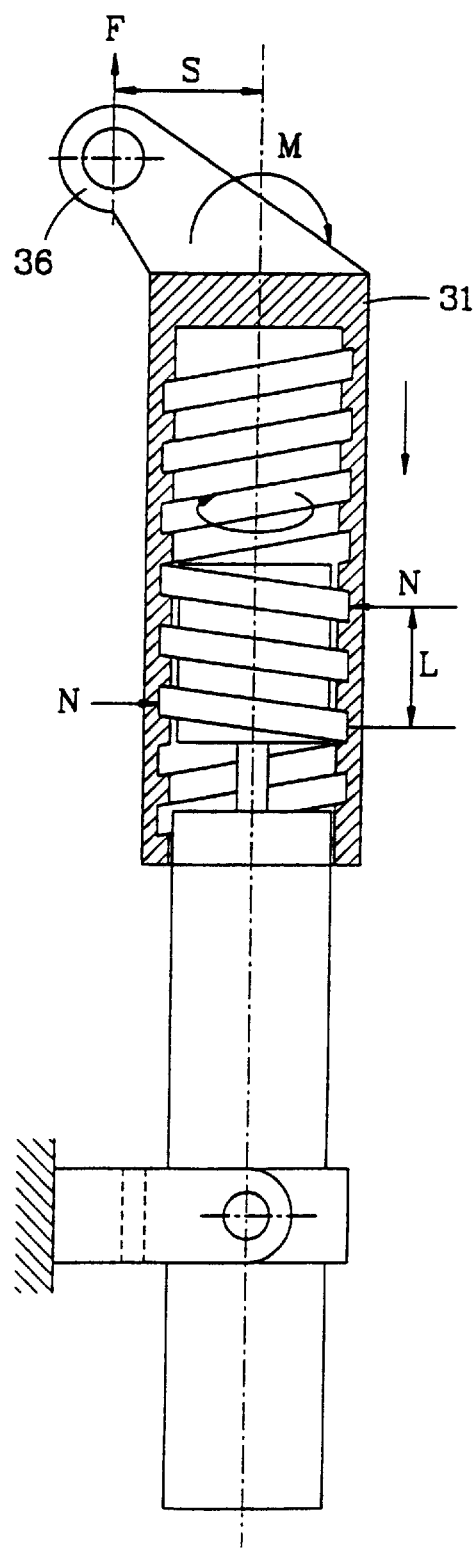
FIG. 3 is a partially cross-sectioned schematic view of a conventional linear actuator employing a screw mechanism.
Figure 4:
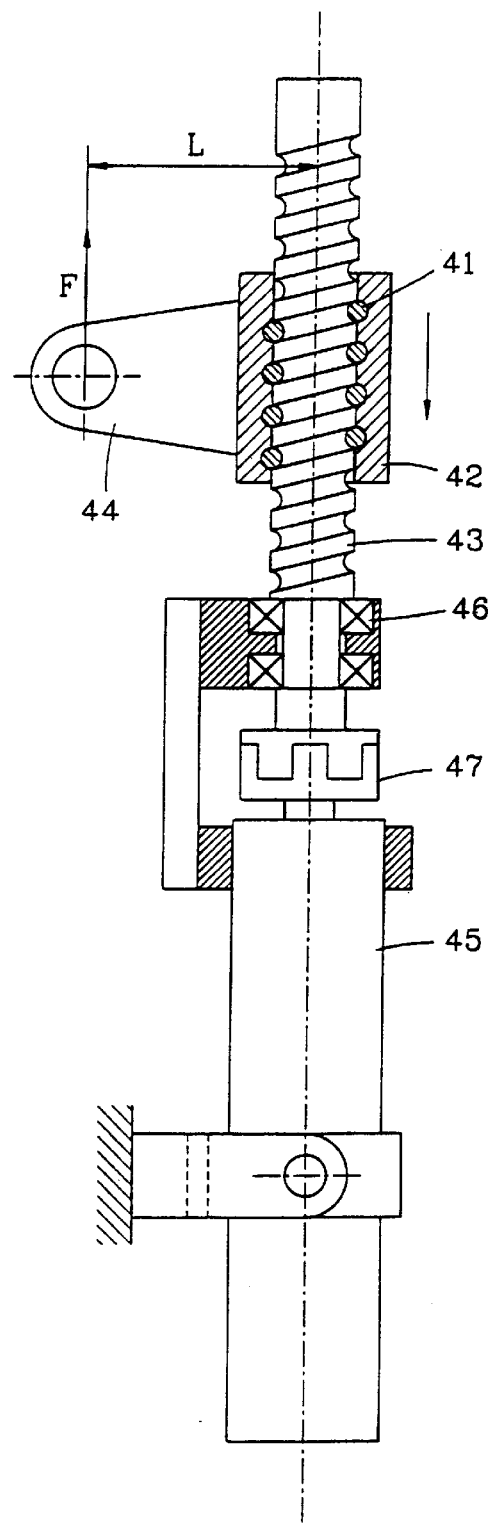
FIG. 4 is a partially cross-sectioned schematic view of a conventional linear actuator employing a ball screw mechanism.
Figure 5:
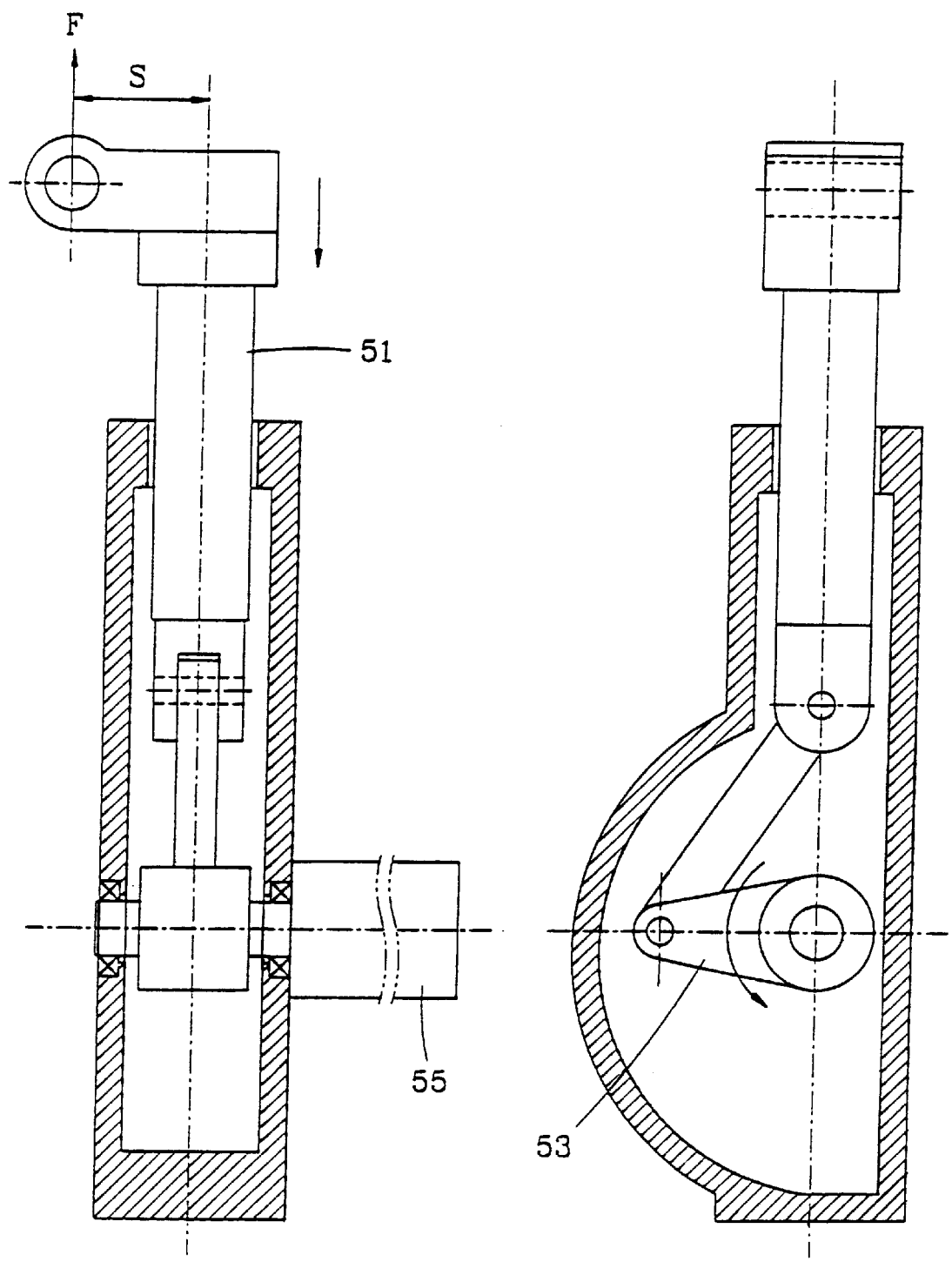
FIG. 5 is partially cross-sectioned schematic view of a conventional linear actuator employing a crank-arm mechanism.

The connection link mounted at an end portion of the cylindrical movement tube is connected to another arm as shown in FIG. 1, thereby accomplishing an effective operation of a pick and place apparatus having a plurality of joints.

As described above, the linear actuator according to the present invention has an advantage of the linear actuator illustrated in FIGS. 6A to 6C as well as those of the conventional screw type linear actuator.

That is, the linear actuator enables a lengthwise extension/retraction with a relatively small bearing rolling friction.

Also, differently from the actuator as shown in FIGS. 6A to 6C, the linear actuator according to the present invention does not require additional radial bearings 69,69' for supporting the rotational shaft to the rotational driving means, or a coupling 70 for connecting a rotative motor, thereby improving the operational efficiency due to the small rolling friction as well as realizing a simplified and cost-effective linear actuator.

As the present invention may be embodied in several forms without departing from the spirit of the essential characteristics thereof, it should also be understood that the above-described embodiments are not limited by the details of the foregoing description, unless otherwise specified, but rather should be construed broadly within its spirit and scope as defined in the appended claims, and therefore all changes and modifications that fall within the meets and bounds of the claim, or equivalences of such meets and bounds are therefore intended to embrace the appended claims.

What is claimed is:

1. A linear actuator, comprising:

a rotary driving means having a rotational shaft;

a rotational unit engaged to the rotational shaft of the rotary driving means, and extending longitudinally along the rotational shaft and rotatably driven by the rotary driving means;

a plurality of radial bearings each respectively having a bearing rotation shaft inclined by an inclination angle (α) relative to the rotational shaft direction, and symmetrically mounted to a respective surface of the rotational unit in the direction of the rotational unit; and, a cylindrical movement tube, surrounding the rotational unit, an inner periphery thereof being in contact with the radial bearings.

2. The linear actuator according to claim 1, wherein the rotational unit comprises:

a central hub portion engaged to the rotational shaft of the rotational driving means;

a plurality of cantilever arms extending along the rotational shaft axial direction by a length (L) on an outer periphery of the central hub portion, radially protruded by a predetermined thickness (H), and disposed in the form of a propeller to be elastically and radially movable; and bending moment adjusting means enabling an adjusting of an initial bending moment toward a radial direction of the cantilever arms, wherein each opposing end surface of the respective cantilever arms is sloped by an inclination angle (α) relative to a perpendicular direction of the rotational shaft of the rotational driving means, and wherein the respective radial bearings are correspondingly mounted to the sloped surface at each opposing end surface of the cantilevers by a bolt penetrating a center of the corresponding bearing.

3. The linear actuator of claim 1, wherein the plurality of radial bearings are mounted at a regular angular interval of 120°.

4. The linear actuator according to claim 1, wherein the radial bearings are ball bearings or roller bearings.

5. The linear actuator according to claim 2, wherein the rotational driving means is an electrical motor, and the initial bending moment adjusting means is a screw penetrating through each respective cantilever arm and inscribed on the outer periphery of the central hub portion at one end thereof.

6. The linear actuator according to claim 2, wherein a radial elastic coefficient of the cantilever arms is controlled by changing at least one of the radial thickness (H) and the longitudinal length (L) of the longitudinally extending cantilever arms.

7. The linear actuator according to claim 1, a female screw portion is provided on the inner surface of the cylindrical movement tube, the female screw having a pitch angle α corresponding to said inclination angle α, whereby the radial bearings are movable along the female screw portion while engaging with the threads of the female screw portion.

8. The linear actuator according to claim 7, wherein the plurality of radial bearings are mounted at a regular angular interval of 120°, and the female screw portion comprises a triple-threaded screw to receive the plurality of radial bearings at each opposing surface of the rotational unit.

9. The linear actuator according to claim 1, wherein the plurality of radial bearings comprise three bearing pairs.

10. The linear actuator according to claim 3, wherein the plurality of radial bearings comprise three bearing pairs.

11. The linear actuator according to claim 8, wherein the plurality of radial bearings comprise three bearing pairs.

* * * * *